April 3, 1962 | A. M. SHALLOWAY | 3,028,590

PULSE OPERATED ANALOG-TO-DIGITAL CONVERTER

Filed May 6, 1959 | 2 Sheets-Sheet 1

INVENTOR.
ARTHUR M. SHALLOWAY

BY

ATTORNEY

April 3, 1962 A. M. SHALLOWAY 3,028,590

PULSE OPERATED ANALOG-TO-DIGITAL CONVERTER

Filed May 6, 1959 2 Sheets-Sheet 2

*INVENTOR.*
ARTHUR M. SHALLOWAY
*BY* T. L. Styner
ATTORNEY

United States Patent Office 3,028,590

Patented Apr. 3, 1962

3,028,590

PULSE OPERATED ANALOG-TO-DIGITAL CONVERTER

Arthur M. Shalloway, Rochester, N.Y., assignor to General Dynamics Corporation, Rochester, N.Y., a corporation of Delaware Filed May 6, 1959, Ser. No. 811,364
2 Claims. (Cl. 340—347)

This invention relates to analog-to-digital converters and is particularly directed to circuitry for reading out the converter information. The converter contemplated here is of the type which will convert analog mechanical motion, such as shaft rotation, to digital electrical information.

A common analog-to-digital converter comprises a plurality of commutators on a common shaft, the segments of which are moved in unison by the shaft, and the wiping brushes of which are connected to binary computing, storing, or recording circuits for the utilization of the motion information. The brush or brushes move alternately across segments of conducting and of insulating material so that a brush circuit will alternately open and close and thus produce binary voltages of "high" and "low" values. Either voltage may be at reference ground, is desired. Customarily, the commutator is energized with direct current voltages. This gives rise to arcing at the boundaries of the segments and may produce ambiguities or errors should binary readings be taken at the instant the brush is moving across the edge of a segment. Steady direct current signals, further, are not readily adapted to shift registers nor pulse operated systems where digital computation of the converter output must be performed.

An object of this invention is to provide improved circuits for operating analog-to-digital converters.

A more specific object of this invention is to provide an improved analog-to-digital converter in which the positions of commutator segments are read at regular intervals by short pulses of a clock pulse generator to obviate steady direct current voltages on the segments.

A still more specific object of this invention is to provide improved circuits for mechanical analog-to-electrical digital converters in which ambiguities and errors created by commutator switch are eliminated.

The objects of this invention are attained in a circuit for applying recurring clock pulses to the commutator segments of an analog-to-digital converter. The size of the segments of one group of segments of one commutator are so related to the size of the segments of the next adjacent commutator that the electrical switching action of the several commutators can be interpreted as successive significant digits in a binary numbering system. The segments of the one group of segments, which are the smallest in size and subtend the smallest increment of motion, are connected to two terminals from which may be read out a binary digit and its complement of least significance. A timing pulse source is connected to the two readout terminals through two paths. One path is through the commutator segments and the other path is through an inhibitor-type AND gate. When the first path is closed by the commutator brush circuit, timing pulses appear at one terminal, their appearance at the other terminal being prevented or inhibited by the gate. When the commutator circuit is open, however, the inhibition is removed at the gate and the timing pulses arrive at said other terminal. Hence, the two terminals are selectively energized by clock pulses depending on whether the commutator segment under a brush is conducting or nonconducting.

Other objects and features of this invention will become apparent to those skilled in the art by referring to specific embodiments of the invention described in the following specification and shown in the accompanying drawings in which.

Figure 1:
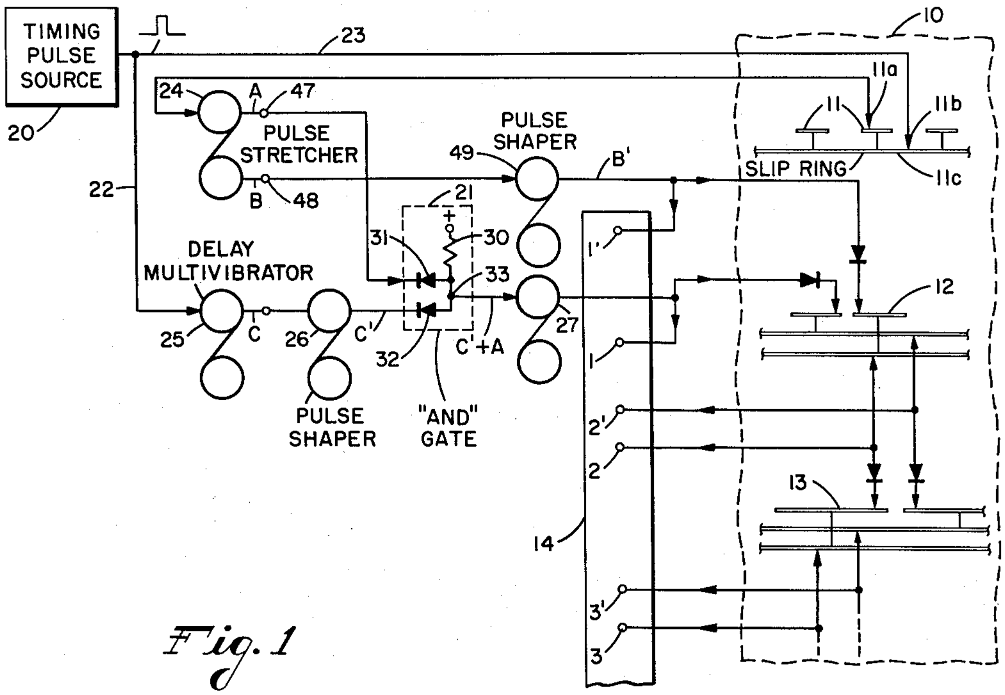
FIG. 1 shows a fragmentary diagrammatic view of an analog-to-digital commutator and a block diagram of the circuits of this invention connected to the commutator.

At 10 in FIG. 1 is a shown a schematic circuit diagram of part of a mechanical analog-to-digital converter, and shows for purposes of illustration three groups of segments identified by segments 11, 12 and 13, respectively. Conductive segments 11, separated by nonconducting segments of equal width, are of the smallest size in the commutator and respond to the smallest increment of motion of the commutator, and produce the first binary digit and its complement, 1 and 1'. Larger increments of motion are detected by segments 12 and 13 of progressively larger dimensions to produce the succesively more significant binary digits of motion. A circuit-making brush **11*a* is positioned to engage the commutator segments while brush 11*b* is provided to wipe slip ring 11*c***.

The useful outputs of the converter appear at the series of terminals on terminal board 14, the terminals 1, 2 and 3 producing electrical signals representative of the first, second and third significant binary digits of the system. Terminals 1', 2' and 3' produce electrical information which is the complement, respectively, of the digits of terminals 1, 2 and 3. Such complementary signals are particularly useful in computer circuits where subtraction must be performed.

The timing pulse source 20 provides a high frequency series of regularly spaced pulses for energizing the commutator. A frequency of, say 25 kilocycles per second and pulse widths of but a few microseconds duration are contemplated, although frequencies and pulse widths of higher or lower value could be employed.

According to this invention, the pulses of timing source 20 are directed to output terminal 1 when the brush circuits through segments 11 are open; and, the pulses of timing source 20 are directed to output terminal 1' when the circuit of brush 11 is closed. To accomplish this result, two circuits designated 22 and 23, are connected between the pulse source 20 and the terminals 1 and 1', respectively. An inhibitor gate 21 is placed in one circuit and will prevent passage of timing pulses to terminal 1 when timing pulses are flowing in the other circuit to terminal 1'. Let it be assumed first that the circuit of brush 11 is closed. Pulses on line 23 will then move immediately to the trigger circuit of the pulse stretcher 24 which preferably comprises the dual amplifiers of a delay-type monostable multivibrator.

Figure 4:
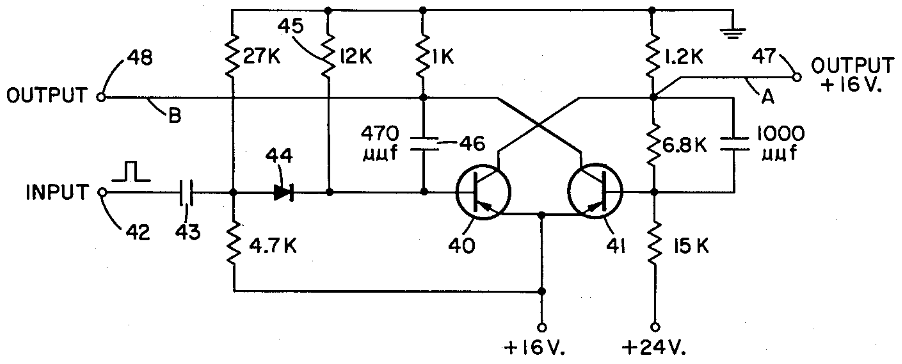
FIG. 4 is a circuit schematic of a bistable multivibrator or flip-flop employed in the system of FIG. 1.

The pulse stretcher 24 may be of the type shown in FIG. 4 where transistors are connected side-by-side with the output of each coupled to the input of the other to insure stable conduction in one and blocking in the other. This pulse stretcher, to be described in greater detail below, is provided with time constant circuits in one feedback circuit to cause the multivibrator to remain for a measured length of time in a second unstable state before returning to its first stable state. One excursion from stable to unstable to stable condition is initiated by a single pulse from the timing pulse source 20. Hence, the timing pulse of, say, 1 microsecond can be stretched to any desired time period. The optimum duration of the stretched pulse is limited by the clock frequency and is sufficient to permit the readout at terminal 1' after the clock pulse enters the other circuit 22. The duration is sufficient to permit operation of the inhibiting gate 21 and the blocking of the timing pulse through circuit 22. That is, the reliable exclusion of timing pulses from terminal 1 when there are pulses at terminal 1′ requires consideration of set and reset periods and settling time for the connected circuits.

Assume now that the circuit of brush 11 is open when a timing pulse is received. The pulse stretcher in this case is not operated, of course, and the voltage A at its output terminal 47 remains "high." In the illustrated example, a "high" voltage on one input of the gate circuit 21 permits the gate to remain open for the passage of a signal on the other input circuit to the output. The timing pulse in circuit 22 then traverses the delay multivibrator 25, the pulse shaper 26, the gate 21 and the pulse shaper 27 to terminal 1. That is, gate 21 inhibits the passage of a timing pulse through circuit 22 only when brush circuit 11 is closed and permits passage of a timing pulse through gate 21 when brush circuit 11 is open.

The gate circuit 21 may be of many types, but the conventional AND gate shown in FIG. 1 operates satisfactorily and is preferred. Current flows through resistor 30, of relatively high ohmic value, from a high positive potential and hence through the two parallel diodes 31 and 32 to low potential points in the multivibrators 24 and 26. The diodes are so polarized that current normally flows and both diodes must be back-biased to interrupt current through resistor 30 and raise the voltage of the junction terminal 33 to a predetermined high level at or near the potential of the bias source.

As mentioned above, the pulse stretcher 24 is of the multivibrator type, one example of which is illustrated in FIG. 4. The two transistors 40 and 41 are of the P-N-P type and are connected with the emitters in parallel and biased positively as shown. By coupling each collector, respectively, to the base of the opposite transistor, circuit parameters can easily be chosen to insure cutoff in one transistor while the other is conducting heavily. In the example shown, it is assumed that transistor 40 is normally conducting and terminal 47 stands high and that transistor 41 is normally cutoff and terminal 48 normally stands low. Positive-going trigger pulses at input terminal 42 are applied to transistor 40 through coupling condenser 43 and diode 44, and drives the base of transistor 40 in a positive direction which cuts off transistor 40. The potential at the base of transistor 41 rises and because of the regenerative feedback connections the base of transistor 41 is sharply driven negatively and the base of transistor 40 is driven and held positive. The time constant determined by resistor 45 and condenser 46 determines the time during which the base of transistor 40 is held positive. When the charge on condenser 46 finally leaks off to the point where emitter-collector current starts to flow, the multivibrator circuit will suddenly return to its initial stable state. In the example shown, output terminal 47 normally stands high while output terminal 48 normally stands low, these conditions being reversed for the duration of the RC time constant of elements 45—46 and the reversal being measured from the instant of the triggering pulse at input 42. By employing diode 44, polarized as shown, only positive-going timing pulses can be effective in triggering the multivibrator. At 43 is a direct current blocking condenser.

By reducing the RC time constant of resistor 45 and condenser 46 to zero as by eliminating resistor 45, the pulse stretching features of the circuit of FIG. 4 can be minimized and the reversal of the steady state can be reduced to a time duration comparable to the duration of the triggering pulse itself. The circuit of FIG. 4 thus modified may now be employed as a pulse shaper to reinsert a pulse of the amplitude, duration, and shape of the original triggering timing pulse. It has been found desirable to connect pulse shaping circuits 26, 27 and 49 in the output circuits of the pulse stretching multivibrators and gate, as shown in FIG. 1, for preserving the shape of the timing pulses.

It is preferred that the delay of multivibrator 25 be adjusted to some value less than the stretch of multivibrator 24 so that the trailing edges of the output of multivibrator 24 follows by a finite time the output of multivibrator 25. This permits the circuitry of pulse circuit 22 to settle during operation of pulse stretcher 24. This settling time insures closure of gate 21 and exclusion of timing pulses from terminal 1, while the time pulse proceeds through the closed brush circuit to terminal 1′.

Figure 2:
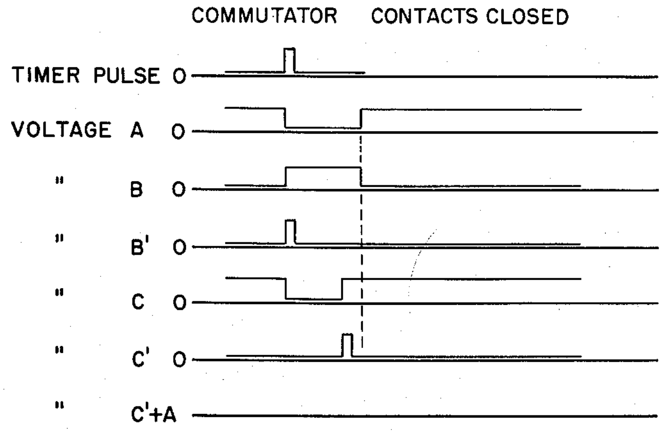
FIGS. 2 and 3 show time charts of important voltages in the system of FIG. 1.
Figure 3:
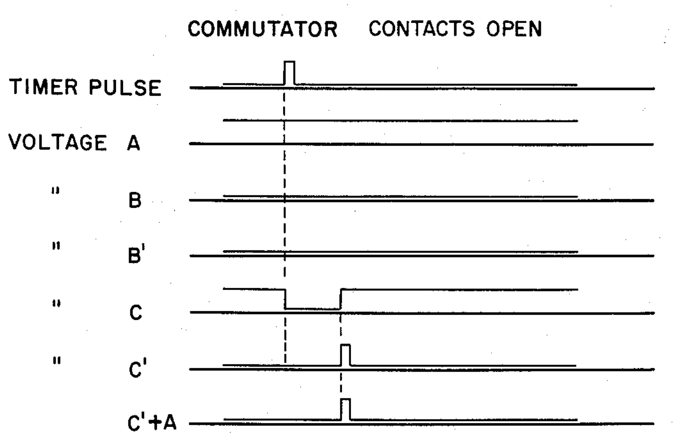

The operation of the system of FIG. 1 may be understood by examining the voltage-time charts of FIGS. 2 and 3. In FIG. 2 it is assumed that the circuit 23, including brush 11, has been closed. The timing pulse arriving at input terminal 42 causes voltage A at output terminal 47 to drop from some "high" value to some "low" value, say zero reference ground, at which potential it remains for a time determined by the RC time constant of the multivibrator 24. The complementary voltage B at output terminal 48 rises from zero to the "high" level and remains at the "high" level for the duration of the stretch. The pulse shaper 49 responds only to the positive-going portion of the voltage B of terminal 47 and applies the output voltage B′ of the shaper to terminal 1′. The same timing pulse operates the delay multivibrator 25 producing voltage C at the output terminal of the multivibrator 25 similar to the voltage A, but of a duration shorter than the duration of pulse A. Accordingly, the output voltage C′ of the pulse shaper occurs before the end of the pulse voltage A. While voltage A is low, back bias of diode 31 of the inhibitor AND gate 21 is removed and the current flows through resistor 30, and the application of the positive pulse C′ and its momentary back bias can produce no effect at output terminal 33 of the gate. Hence, no timing pulse can appear at terminal 1 when that timing pulse is applied to terminal 1′, which is the result desired.

In FIG. 3, it is assumed the brush circuit is open and that the voltages A and B are undisturbed. Since voltage A remains high, diode 31 remains back-biased and cutoff and the arrival of pulse C′ momentarily back biases diode 32, causing a momentary rise in potential of terminal 33. The voltage of terminal 33 is labeled $C'+A$ in FIGS. 2 and 3. Hence, the timing pulse appears at terminal 1 while the timing pulse is excluded from terminal 1′, which again is the result desired.

These least significant digits 1 and 1′ of the binary output of the converter are conducted, in the example shown, to the commutator segments 12 and, hence, to commutator segments 13 for the generation of the successively more significant digits of the converter output. This converter circuitry is not claimed.

Many modifications may be made in the suggested circuitry of this invention without departing from the scope of the appended claims. For example, the measurement of time in the multivibrator circuits shown and the pulse shaping functions may be accomplished by other means. It is merely necessary that delays be provided in each of the two branch circuits 22 and 23 to permit operation of the inhibiting AND gate and the positive exclusion of the timing pulse from either one of the two output terminals 1 and 1′ when the other receives the pulse. The converter circuits of this invention are particularly adapted to pulse operation as distinguished from steady direct current operation. Errors and ambiguities caused by switching action at the boundaries of the commutator segments are effectively eliminated.

What is claimed is:

1. In combination with an analog-to-digital converter having a commutator assembly with at least one series of alternate insulating and conducting commutator segments and a cooperating brush for wiping over said segments to alternately open and close the brush circuit;

a timing pulse source, two complementary terminals from which binary digital information can be taken representative of the open and closed conditions of said brush circuit, two circuit paths between the output of said pulse source and said two terminals, respectively; one of said paths including a pulse stretcher of the monostable multivibrator type being adjusted to remain in the unstable state a first predetermined period of time, the other of said paths including in series a delay multivibrator and an inhibitor AND gate, said delay multivibrator being adjusted to delay pulses in said other path for a second predetermined period of time less than said first predetermined period of time, said AND gate having a control circuit and one output circuit, said control circuit being connected to said pulse stretcher to inhibit passage in said second path when a pulse is in said first path.

2. Means in combination with the brush circuit of a commutator of an analog-to-digital converter for routing readout voltage from a voltage pulse source to either, but not simultaneously to both, of two complementary readout terminals in response, respectively, to open and closed brush circuits; a first path means including said brush circuit coupling said voltage pulse source to one of said terminals, a second path coupling said voltage pulse source to the other of said terminals, a first delay means comprising a monostable multivibrator in said first path for stretching the voltage pulses, a second delay means in said second path for delaying the application of voltage pulses to said other terminal, the delay of said first delay means being greater than the delay of said second delay means, and a gate means in said second path having a control circuit, said control circuit being responsive to the stretched pulses of said first delay means for inhibiting the passage of pulse voltage to said second terminal during passage of pulse voltage to said first terminal.

References Cited in the file of this patent

UNITED STATES PATENTS

| | | |
|---|---|---|
| 2,873,440 | Speller | Feb. 10, 1959 |
| 2,873,442 | Ziserman | Feb. 10, 1959 |

OTHER REFERENCES

"Instruments and Automation," vol. 29, Issue 6, June 1956, pp. 1109–1117.

UNITED STATES PATENT OFFICE

CERTIFICATE OF CORRECTION

Patent No. 3,028,590 April 3, 1962

Arthur M. Shalloway

It is hereby certified that error appears in the above numbered patent requiring correction and that the said Letters Patent should read as corrected below.

Column 1, line 26, for "is", first occurrence, read -- if --; line 45, for "switch" read -- switching --; column 2, line 12, strike out "a", first occurrence; line 22, for "succesively" read -- successively --.

Signed and sealed this 11th day of September 1962.

(SEAL)
Attest:

ERNEST W. SWIDER
Attesting Officer

DAVID L. LADD
Commissioner of Patents